Aug. 4, 1925.
A. B. RAY
1,548,280
PROCESS OF RECOVERING ABSORBABLE CONSTITUENTS FROM GAS STREAMS
Filed Nov. 12, 1924
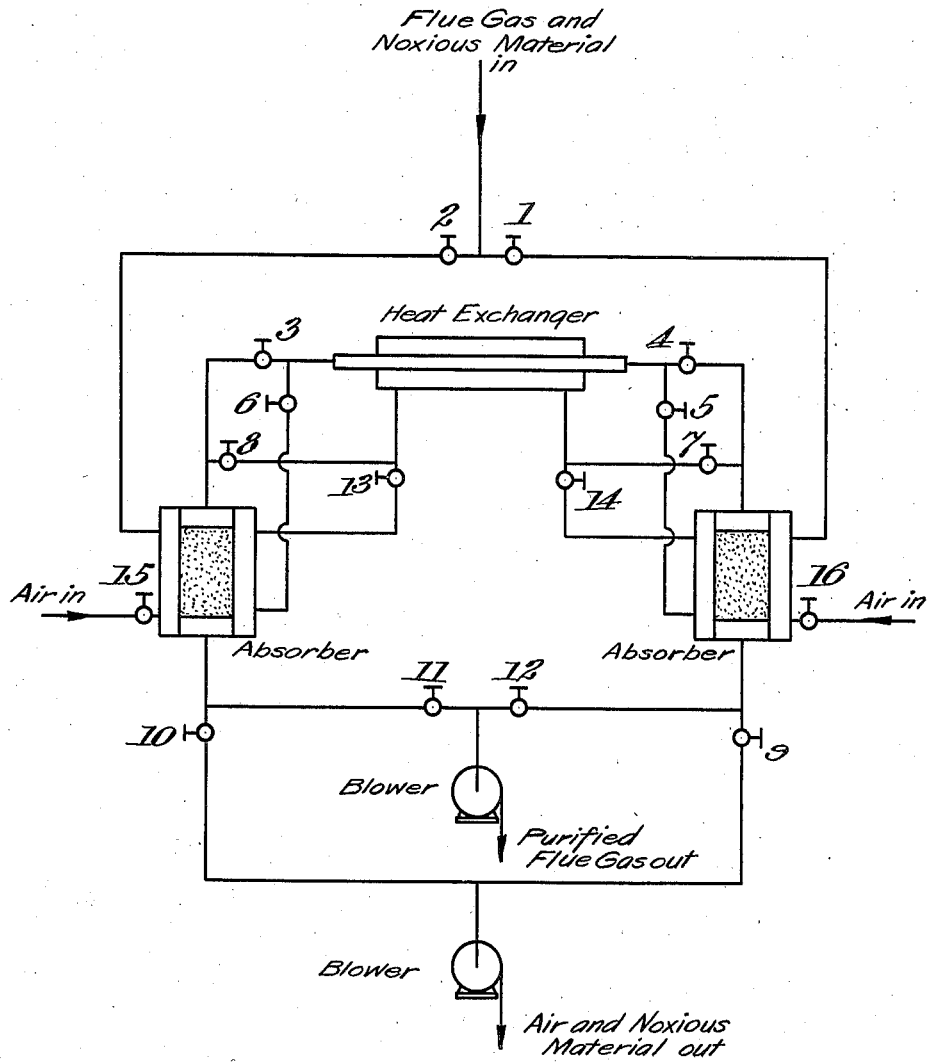

Patented Aug. 4, 1925.

1,548,280

UNITED STATES PATENT OFFICE.

ARTHUR B. RAY, OF BAYSIDE, NEW YORK, ASSIGNOR TO CARBIDE AND CARBON CHEMICALS CORPORATION, A CORPORATION OF NEW YORK.

PROCESS OF RECOVERING ABSORBABLE CONSTITUENTS FROM GAS STREAMS.

Application filed November 12, 1924. Serial No. 749,572.

*To all whom it may concern:*

Be it known that I, ARTHUR B. RAY, a citizen of the United States, residing at Bayside, in the county of Queens and State of New York, have invented certain new and useful Improvements in Processes of Recovering Absorbable Constituents from Gas Streams, of which the following is a specification.

The invention is a process for separating from a gas mixture a material which is a constituent thereof, by the use of an absorbent. The invention affords procedure whereby a material may be transferred from the gas mixture in which it enters the process to another gas of different composition; and it makes it possible to transfer heat from the gas mixture originally containing the material to the gas into which the material is incorporated by the process. The separation of gas mixtures by the use of an absorbent usually requires a cooling of the gas mixture in order that the absorbent may act more effectively. It may then be necessary to heat the absorbed material in order to utilize it; and it is usually necessary to heat the absorbent to expel the absorbed material. By the present invention, where the gas originally containing the material is at an elevated temperature, its heat may be utilized to expel the material after it has been taken up by the absorbent, and to heat the material so expelled.

An application of the invention is the removal of noxious substances from flue gases which have been used to dry tankage or the like by direct contact therewith. These noxious materials can be removed by absorbents, but for reasons of economy the absorbed material must be expelled, revivifying the absorbent. The noxious materials are ultimately destroyed by burning, and this requires more oxygen than is present in the flue gases in which they were originally carried. It is therefore convenient to transfer the noxious materials to air, and to pass this air to the furnaces in which the flue gases are produced. It is of course desirable to transfer the heat content of the flue gases to this air in order to increase the efficiency of the furnaces.

In other cases the material carried in the original gas stream may be a substance, such as a volatile oxid, which can be converted into a valuable product, such as a higher oxid, a higher oxygen concentration than that of the original gas mixture being necessary to effect the conversion. On the other hand it may be desired to transfer the absorbable material to an inert gas such as nitrogen or carbon dioxid, or to an oxygen-free gas reactive with the material.

Apparatus suitable for use in connection with the process of destroying noxious material referred to above is shown diagrammatically in the accompanying drawing. The drawing shows two similar absorbers and a heat exchanger together with valved pipes and blowers arranged to carry gases through the system in the desired paths. Assuming the absorbent in the left-hand absorber to be charged with noxious material, the absorbent in the right-hand absorber revivified, the odd-numbered valves to be closed and the even-numbered valves open, hot flue gas bearing noxious material enters the system and flows through the jacket of the left-hand absorber, thereby heating the absorbent and cooling the flue gas. The gas then passes through the central conduit of the heat exchanger, where it is further cooled, and then passes through the right-hand absorber in contact with the absorbent, giving up its noxious material thereto. The purified flue gas is vented to the atmosphere.

Simultaneously air is admitted to the jacket of the right-hand absorber and passes through it, taking up heat from any which remains in the flue gas, and from any heat which is liberated by the absorption. The slightly warmed air then passes through the outer compartment of the heat exchanger where it is further heated, and then passes through the left-hand absorber in contact with the hot absorbent therein. The noxious material is given up by the absorbent to the heated air, and the air passes out of the system to the furnaces bearing at least a part of the heat which left the furnaces in the flue gas.

When the absorbers have respectively become revivified and saturated to the desired degree, the positions of all valves are reversed and the process continues as before.

The process is especially designed for use with solid absorbents, particularly activated carbon.

A wide variety of accessory apparatus not described herein may of course be incorporated in the system. Supplementary heaters or coolers may be used, and the heat exchanger may be omitted. Scrubbers, driers, condensers, etc., may be inserted in the gas paths in some instances. Certain portions of the gases may be by-passed around parts of the apparatus, through supplementary apparatus if desired, for closer control of the process. The essential principles of the process are not altered by such modifications, and it is my purpose to cover these principles broadly in the appended claims.

I claim:

1. Process of transferring a material carried by a heated gas mixture to a cooler gas of different composition, which comprises cooling the heated mixture by transferring heat therefrom to a first body of absorbent containing said material, thereby heating the absorbent; passing the cooled mixture into contact with a second body of absorbent to collect said material therein; cooling the second body of absorbent with the cooler gas mixture, thereby heating said gas mixture; passing the gas so heated into contact with the first body of absorbent to take up said material therefrom; and periodically interchanging said bodies of absorbent.

2. Process of transferring a material carried by a heated gas mixture to a cooler gas of different composition, which comprises cooling the heated mixture by transferring heat therefrom to a first body of solid absorbent containing said material, thereby heating the solid absorbent; passing the cooled mixture into contact with a second body of solid absorbent to collect said material therein; cooling the second body of solid absorbent with the cooler gas mixture, thereby heating said gas mixture; passing the gas so heated into contact with the first body of solid absorbent to take up said material therefrom; and periodically interchanging said bodies of solid absorbent.

3. Process of transferring a material carried by a heated gas mixture to a cooler gas of different composition, which comprises cooling the heated mixture by transferring heat therefrom to a first body of activated carbon containing said material, thereby heating the activated carbon; passing the cooled mixture into contact with a second body of activated carbon to collect said material therein; cooling the second body of activated carbon with the cooler gas mixture, thereby heating said gas mixture; passing the gas so heated into contact with the first body of activated carbon to take up said material therefrom; and periodically interchanging said bodies of activated carbon.

4. Process of transferring an oxidizable material carried by a heated gas mixture to a cooler gas of higher oxygen content, which comprises cooling the heated mixture by transferring heat therefrom to a first body of absorbent containing said material, thereby heating the absorbent; passing the cooled mixture into contact with a second body of absorbent to collect said material therein; cooling the second body of absorbent with the cooler gas mixture, thereby heating said gas mixture; passing the gas so heated into contact with the first body of absorbent to take up said material therefrom; and periodically interchanging said bodies of absorbent.

5. Process of transferring an oxidizable material carried by a heated gas mixture to a cooler gas of higher oxygen content, which comprises cooling the heated mixture by transferring heat therefrom to a first body of solid absorbent containing said material, thereby heating the solid absorbent; passing the cooled mixture into contact with a second body of solid absorbent to collect said material therein; cooling the second body of solid absorbent with the cooler gas mixture, thereby heating said gas mixture; passing the gas so heated into contact with the first body of solid absorbent to take up said material therefrom; and periodically interchanging said bodies of solid absorbent.

6. Process of transferring an oxidizable material carried by a heated gas mixture to a cooler gas of higher oxygen content, which comprises cooling the heated mixture by transferring heat therefrom to a first body of activated carbon containing said material, thereby heating the activated carbon; passing the cooled mixture into contact with a second body of activated carbon to collect said material therein; cooling the second body of activated carbon with the cooler gas mixture, thereby heating said gas mixture; passing the gas so heated into contact with the first body of activated carbon to take up said material therefrom; and periodically interchanging said bodies of activated carbon.

7. Process of transferring a noxious oxidizable material carried by flue gases to air, which comprises cooling the flue gases by transferring heat therefrom to a first body of absorbent containing said noxious material, thereby heating the absorbent; passing the cooled flue gases into contact with the second body of absorbent to collect said noxious material therein; cooling the second body of absorbent with air, thereby heating said air; passing the air so heated into contact with the first body of absorbent to take up said noxious material therefrom; and periodically interchanging said bodies of absorbent.

8. Process of transferring a noxious oxidizable material carried by flue gases to air, which comprises cooling the flue gases by transferring heat therefrom to a first body of solid absorbent containing said noxious material, thereby heating the solid absorbent; passing the cooled flue gases into contact with a second body of solid absorbent to collect said noxious material therein; cooling the second body of solid absorbent with air, thereby heating said air; passing the air so heated into contact with the first body of solid absorbent to take up said noxious material therefrom; and periodically interchanging said bodies of solid absorbent.

9. Process of transferring a noxious oxidizable material carried by flue gases to air, which comprises cooling the flue gases by transferring heat therefrom to a first body of activated carbon containing said noxious material, thereby heating the activated carbon; passing the cooled flue gases into contact with a second body of activated carbon to collect said noxious material therein; cooling the second body of activated carbon with air, thereby heating said air; passing the air so heated into contact with the first body of activated carbon to take up said noxious material therefrom; and periodically interchanging said bodies of activated carbon.

10. Process of transferring material carried by a heated gas mixture to a cooler gas of different composition, which comprises cooling the heated mixture by heat exchange with the gas to which the material is to be transferred; passing the gas heated by said heat exchange into contact with a first body of absorbent containing said material to take up said material therefrom; passing the gas mixture cooled by said heat exchange into contact with a second body of absorbent to collect said material therein; and periodically interchanging said bodies of absorbent.

In testimony whereof, I affix my signature.

ARTHUR B. RAY.